United States Patent [19]

Tano

[11] Patent Number: 4,909,514

[45] Date of Patent: Mar. 20, 1990

[54] HOLDER FOR MANUAL VIDEO GAME CONTROLLER TOGGLE SWITCH MECHANISMS

[76] Inventor: Robert S. Tano, 7296 Kindler Rd., Columbia, Md. 21046

[21] Appl. No.: 333,557

[22] Filed: Apr. 5, 1989

Related U.S. Application Data

[63] Continuation-in-part of Ser. No. 261,576, Oct. 24, 1988, abandoned.

[51] Int. Cl.[4] .................................... A63B 71/00

[52] U.S. Cl. .................................... 273/148 B

[58] Field of Search .................... 273/148 B; 248/174, 248/291; 108/43

[56] References Cited

U.S. PATENT DOCUMENTS

| | | | |
|---|---|---|---|
| 3,407,757 | 10/1968 | Warner | 273/148 B |
| 4,494,754 | 1/1985 | Wagner | 273/148 B |
| 4,573,682 | 3/1986 | Mayon | 273/148 B |
| 4,630,823 | 12/1986 | Grant | 273/148 B |
| 4,648,603 | 3/1987 | Hayford | 273/148 B |

*Primary Examiner*—Edward M. Coven
*Assistant Examiner*—Gary Jackson

[57] ABSTRACT

A video game or model plane, car, boat or the like controller toggle swith assembly holding device which comprises a rigid elongated support member of wood, metal, fiberglass, plastic or other suitable rigid material having physical holding handles, straps and the like at one end for enabling a player/operator of a video game or model plane, car, boat or the like to firmly hold the support member and restrain it from physically moving. The holder is completed by securing a manually operable controller toggle switch of the type used in playing video games or controlling model planes, cars, boats or the like at a fixed position on the rigid physical support member at a distance proportioned to the arm length of a player/operator using the controller toggle switch assembly.

34 Claims, 4 Drawing Sheets

HOLDER FOR MANUAL VIDEO GAME CONTROLLER TOGGLE SWITCH MECHANISMS

This application is a Continuation-In-Part of prior pending U.S. patent application Ser. No. 261,576, filed Oct. 24, 1988, now abandoned, in the name of Robert S. Tano.

FIELD OF INVENTION

This invention relates to a simple, low cost holder for a manually operated, lever-type, controller toggle switch mechanism used in playing video games, controlling model planes, cars and boats, and the like.

In particular, the holder is designed for use by a player/operator of a video game comprised by a home television set or other similar cathode ray tube display console controlled by a personal computer which is in turn controlled by a player/operator using a manual, lever-type, controller toggle switch mechanism. The controller toggle switch holder comprising this invention is designed to improve the comfort of a video game player while he or she is playing video games over prolonged periods of time.

BACKGROUND OF INVENTION

Most video games of the above briefly-described nature employ a controller toggle switch mechanism of the type disclosed in U.S. Pat. No. 4,530,504, issued July 23, 1985 for a "Stabilizer for Manual Video Game Controller". The particular design of the video game controller toggle switch is not a part of the present invention which is directed to the feature of a simple, low cost holder for the controller toggle switch of a video game, or the like, of the general type described in U.S. Pat. No. 4,530,504.

A number of differently designed holders for manual video game controllers are available in the prior art, as disclosed in the following U.S. Pat. Nos.: 4,491,325—issued Jan. 1, 1985; 4,630,823—issued Dec. 23, 1986; 4,494,754—issued Jan. 22, 1985; 4,422,640—issued Dec. 27, 1983; 4,504,059—issued Mar. 12, 1985; 4,573,682—issued Mar. 4, 1986; 4,648,603—issued Mar. 10, 1987; and 4,484,743—issued Nov. 27, 1984. All of these patents described holders for manual video game controller toggle switches which require specially molded, cast, or machined parts that render the device complex and expensive. Consequently, the selling price of many of these prior art holders to the purchasing public is prohibitive for many potential buyers. In addition, these prior art holders are designed to function differently from the more simple and inexpensive holder which is the subject of this application, as will become apparent from a reading of the following detailed description of the invention.

The problem which the present invention is designed to overcome, can best be appreciated by visualizing the need for holding and manipulating a manually operated, lever-type, video game controller toggle switch such as that disclosed in U.S. Pat. No. 4,530,504 for prolonged periods of time. Such a manually operated controller toggle switch is depicted in FIGS. 1 and 2 of the drawings at 17 secured to the right-hand end of the holding device depicted in FIGS. 1 and 2. It is usual while operating video games employing controller toggle switches of this nature for the player to hold the controller toggle switch assembly in one hand while operating the lever-type toggle of the switch with the other hand. If a game is played over prolonged periods of time, as can often happen when adults are playing against children, the procedure requiring that the player/operator hold the controller toggle lever switch assembly in one hand while operating the toggle lever with the other hand becomes tiring and exhausting rather than enjoyable. Further, tiring and fatigue due to the strain placed on both hands can affect the player's ability to play the video game, particularly where the game is a prolonged one. The same comments are true of controllers for use with model airplanes, cars and boats.

To overcome the above-described problems, a number of solutions have been provided in the prior art, as evidenced by the above-listed prior art United States patents. Most of these prior art patents (with the exception of U.S. Pat. No. 4,491,325) require that a player/operator either sit or kneel on a table-like platform, or grasp it between their knees, or have it strapped to their lap in some manner which is not convenient or comfortable for prolonged periods. U.S. Pat. No. 4,491,325 discloses a control apparatus for video games which has a pistol-like grip type toggle controller employing a swivelled pistol grip that can be both twisted and bent in different directions together with a trigger control interconnected with an arm-band holder that can be strapped to the arm of a player/operator by means of look and looped straps. This integral control toggle and arm support utilizes two interconnecting rods together with mechanical gearing to transmit motions of the pistol grip toggle controller to an electrical signal generator switch mechanism that translates rotary and rocking-type motion of the toggle controller lever into electrical signals for use by the video game computer. Such arrangement requires the casting or machining of specially built mechanical parts, and is quite complex and expensive for use by children.

The present invention overcomes the disadvantages of these prior art video game controller holding devices.

SUMMARY OF INVENTION

It is therefore a primary object of the present invention to provide a simple, low cost holder for a manually operated, lever-type controller toggle switch for a video game which can be used by video game player/operators, or the like, of all ages including small children.

In practicing the invention, a simple, low cost, holder for a manual video game controller toggle switch is provided which comprises physical support means of simple and inexpensive construction formed essentially by a rigid, elongated member fabricated from wood, metal, fiberglass or other plastic material. The elongated member is provided with physical holding means at one of its ends for enabling a player/operator to firmly hold the support member and restrain it from physical movement. This holding means can be in the form of a pistol grip handle firmly secured to the first-mentioned end of the elongated member or an arm brace formed by a hook and looped strapping arrangement, or the like that fits to the forearm of a player/operator. The invention is completed by means for securing a manually operable controller toggle switch for a video game at a fixed position on the physical support member remote from the first-mentioned holding means and at a distance proportioned to the arm length of a player using the video game controller toggle switch.

In a preferred embodiment of the invention, the rigid, elongated physical support member is formed in two parts swivelly secured together at an intermediate point between its ends, and further includes additional securing means for securing together the two parts of the elongated member at different angular positions relative to each other for the comfort of a particular player. The elongated support member further includes means for increasing or decreasing its length to better fit the arm of a particular player/operator. In the species wherein the elongated member is formed in two parts, then each of the two parts can include the means for increasing or decreasing its length. The elongated support member may also further include means for widening the member at at least one or more points along its length so that it can be better secured to and support the device on a player's arm.

In this preferred form of the invention, the holding means at one end of the elongated support member may comprise a VELCRO fastening system secured to the end of a first part of the elongated member for surrounding the forearm of a player/operator and firmly securing the support member to the player's forearm. In the embodiment using a two part elongated member, a pistol grip-type handle is secured to the end of the first part of the elongate member remote from the VELCRO fastening system and adjacent the point where the two parts are swivelly joined together. As a result, a player-/operator can secure the elongated member to his or her forearm with the VELCRO fastening system while grasping the pistol grip with the hand of the same arm and uses his or her other arm to manipulate the manually operated controller toggle switch secured to the far end of the second part of the support member.

In another embodiment of the invention, the holding means comprises a pistol grip secured at one end of the elongated member for grasping with one hand by a player/operator with the manually operated controller toggle switch being secured to the remaining opposite end of the elongated member for manipulation with the remaining hand of the player/operator.

In still another embodiment of the invention, the elongate support member may be originally shaped from tubing in the form of an arc which is proportioned to more comfortably fit the arm of a player/operator while playing video games over prolonged periods of time.

In a still further embodiment of the invention, a holder having a single elongate support member is provided with two manually operated controller switch mechanisms for use in operating more complex video games and/or model planes, cars, boats and the like.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference characters, and wherein.

BEST MODE OF PRACTICING INVENTION

Figure 1:
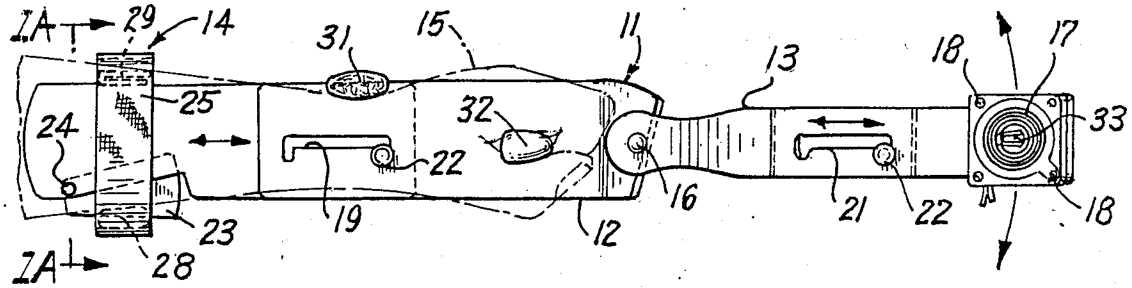
FIG. 1 is a top plan view of a simple, low cost holder for a manual video game controller toggle switch and shows the holder attached to the forearm of a player-/operator with the forearm being shown in phantom lines for purposes of illustration.
Figure 2:
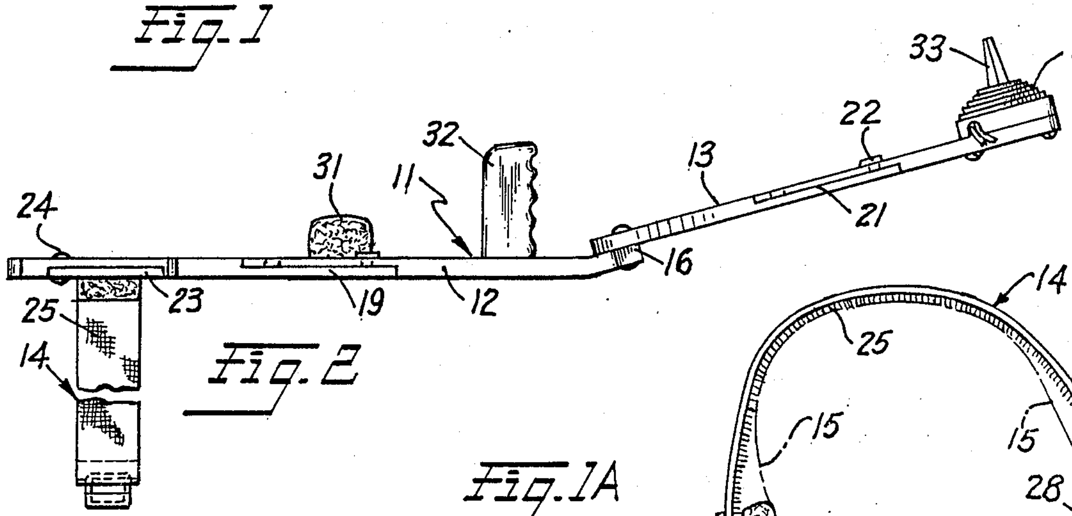
FIG. 2 is side elevational view of the holding device of FIG. 1 shown detached from the forearm of a player.

FIG. 1 is an elevational plan view of a preferred embodiment of the invention wherein an improved holder for a manual video game controller toggle switch mechanism 17 is shown attached to the upper arm of a player/operator. The holder is comprised by physical support means of simple and inexpensive construction formed essentially by a rigid elongated member 11 which, in the embodiment shown in FIG. 1, includes two parts 12 and 13 fabricated from a relatively flat, elongated, wide piece of wood, metal, fiberglass or other suitable rigid plastic material. Physical support means are shown at 14 for holding one end of the rigid, elongated member 11 to the forearm of a player/operator shown in phantom lines at 15. The two parts 12 and 13 of the elongated member 11 are swivelly secured together by a nut and bolt connection 16 at an intermediate point between opposite ends of the elongated member 11. The nut and bolt pair 16 comprise additional securing means for securing together the two parts 12 and 13 of elongated member 11 at different angular positions relative to each other which may be adjusted for the comfort of a player/operator. In FIGS. 1 and 2, the two parts 12 and 13 are shown as being in a straight line.

A manually operated, controller toggle lever switch assembly 17 is secured to the remote end of member 11 by set screws 18 so as to be supported at a fixed position on the elongated member 11 remote from the physical holding means 14 at a distance proportional to the arm length of a player/operator using the controller toggle switch 17.

In the preferred embodiment of the invention, the elongated member 11 includes bayonet fastener means shown at 19 and 21 for increasing or decreasing the length of the elongated member 11 in order to better fit the arm of a player/operator. In the embodiment of the invention shown in FIG. 1, these bayonet fasteners 19 and 21 comprise elongated slots formed in each of the two parts 12 and 13 of elongated member 11, each of which themselves comprise two parts which are secured together by a sliding fit best shown in FIG. 2 via the elongated slot and suitable set screws 22. By this means, the length of either or both of the two parts 12 and 13 of elongated member 11 can be suitably adjusted to best fit the length of the arm of an individual player-/operator.

In addition to the length adjustment for elongated member 11 described above, further means shown at 23 are provided for widening the elongated member 11 at one or more selected points along the length of member 11 in order to better support the arm of a player/operator. This means can comprise a plate 23 which is swivelly secured to the under surface of a part of elongated member 11 to which the first physical securing means 14 is attached with the rotatable plate 23 being set in a desired position by means of a set screw 24.

Figure 1A:
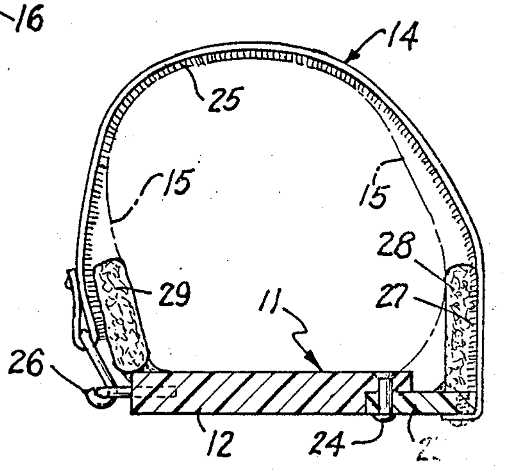
FIG. 1A is an enlarged transverse sectional view taken along lines 1A—1A of FIG. 1.

FIG. 1A is an enlarged, transverse sectional view, taken through plane 1A—1A of FIG. 1, and shows the construction of the first physical holding means 14 for securing one end of elongated member 11 to the forearm (shown at 15) of a player/operator of the video game. As best seen in FIG. 1A, the first physical holding means 14 comprises a hook and looped strap arrangement 25 secured at one end by a hook and eye 26 to one side of the end of part 12 of elongated member 11. The remaining end of the VELCRO strap 25 is secured through the interlocking fiber to a cooperating VELCRO patch 27 secured to the side of part 12 of elongated member 11 on which the swivelled plate 23 is attached. The patch 27 is glued or otherwise fastened to a soft, cushioning pad 28 of a material such as sponge rubber provided to protect the arm of the player/operator from being chaffed by the VELCRO strap 25. Additional resilient padding also preferably is provided as shown at 29 in FIG. 1A and at 31 in FIGS. 1 and 2 of the drawings in order to further improve the comfort of a player/operator while wearing the holder device.

The embodiment of the invention shown in FIGS. 1 and 2 further includes an additional player holding means in the form of a pistol grip 32 which may be grasped with one hand of a player/operator while using the holder device. The pistol grip 32 is secured to the first part 12 of elongated member 11 at a point intermediate the first holding means 14 and the end of member 11 to which the video game controller toggle switch assembly 17 is mounted. By the addition of the pistol grip 32, the holding device can be firmly held using one arm of a player/operator while the remaining arm and hand are free to manipulate the video game controller toggle switch lever 33.

Figure 3:
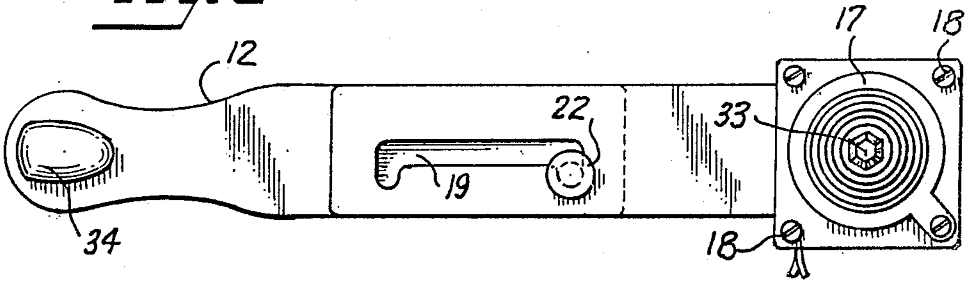
FIG. 3 is an enlarged plan view of an alternative form of the invention which can be held in the hands of a player/operator without attachment to his or her forearm.
Figure 4:
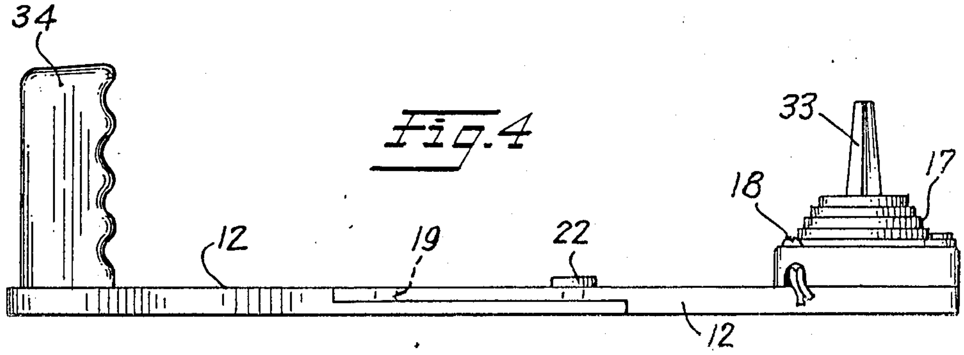
FIG. 4 is a side elevational view of the holding device of FIG. 3.

FIGS. 3 and 4 of the drawings illustrate an alternative construction for the low cost holder for manual video game controller toggle switch according to the invention. In FIGS. 3 and 4 only a single elongated member 12 is employed which also preferably includes the bayonet slot 19 and adjusting screw 22 for adjusting the length of the elongated member 12 to more suitably fit a player/operator using the device. The manually operated, lever type, controller toggle switch assembly 17 is secured to one end of the elongated member 12 by screws 18 as shown in FIG. 3. Only a single pistol-grip type handle 34 is secured to the remaining opposite end of elongated member 12 at a suitable distance so as to allow a player/operator to grip the pistol grip 34 with one hand while reaching and manipulating with the other hand the lever 33 of the controller toggle switch assembly 17. If desired, the elongated member 12 can be orginally fabricated in different lengths for different size player/operators. If thus constructed, there is no need to include the elongated key 19 and adjustment screw 22 for adjusting the length of the elongated base member 12 to fit different sized players.

Figure 7:
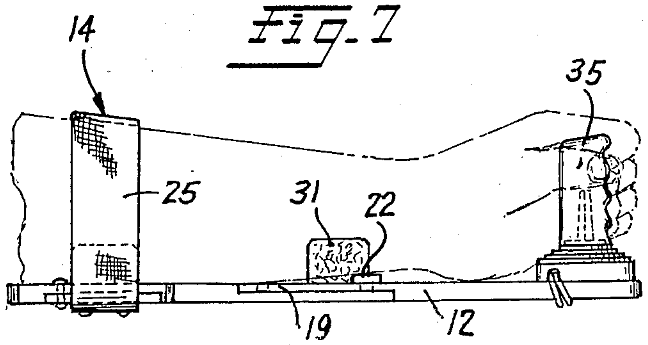
FIG. 7 is a side elevational view of still another alternative form of the invention shown in FIGS. 3 and 4.

FIG. 7 of the drawings illustrates another alternative embodiment of the invention wherein only a single elongated member 12 again is employed and includes a bayonet slot connecting two parts of the member whereby the length of the member 12 can be adjusted by means of the bayonet slot 19 and adjusting screw 22. Here again, if desired, the bayonet slot 19 and adjusting screw 22 can be eliminated for holding devices which are originally fabricated to a number of different lengths so as to accommodate different sized players. The FIG. 7 embodiment of the invention differs from that shown in FIGS. 3 and 4 in that it includes an arm fastening means 14 employing a VELCRO strap securing arrangement for securing the elongated member 12 to the forearm 15 of a player/operator. Additionally, in place of having a conventional lever-operated, controller toggle switch assembly such as shown at 17 in FIGS. 1–4, a specially designed pistol-grip type lever-operated controller toggle 35 is secured to the end of elongated member 12 remote from the holding VELCRO strap 25. This pistol-grip type controller toggle 35 is built onto elongated member 12 at the time of manufacture so that it is securely attached to member 12 and can also serve as a gripping means by a player/operator. This enables the player/operator to maintain the controller toggle assembly 35 fixed not only through the VELCRO strapping arrangement 14, but by the manner in which he or she grasps and holds the pistol-grip operator controller lever 35.

If desired, additional padding of foam rubber 31 can be secured to the elongated base member 12 at points where the arm of the player/operator might be chaffed where it comes into contact with the surface of member 12.

Figure 5:
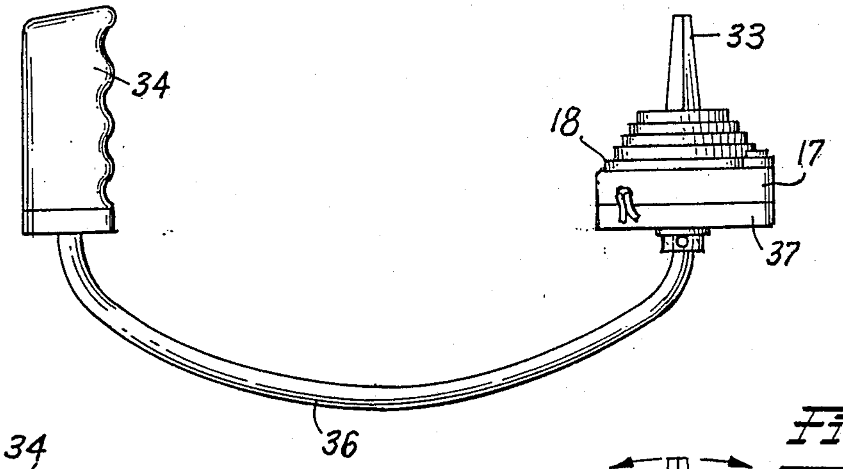
FIG. 5 is a side elevational view of an alternative form of the invention illustrated in FIG. 2.

FIG. 5 of the drawings illustrates still another embodiment of the invention wherein the elongated member 36 is in the form of a cylindrical tube or pipe which is shown bent in an arc to conform it to the shape of a player/operator's arm while it is bent. While in FIG. 5, the tube of pipe 36 is shown as being bent, this is not an absolute necessity and the pipe could be a straight piece of pipe or tubing proportioned to fit the arm of an average size player, or it can be built in a plurality of different lengths to fit different sized player/operators. A pistol-grip type holder 34 is secured to one end of the tubular elongated member 36 with a platform 37 secured to the opposite end of tubular member 36. The lever-type controller toggle switch assembly 17 is secured on the platform 37 similar to the manner shown in FIGS. 1 and 3 of the drawings. In other respects, the holding device shown in FIG. 5 functions in the same manner as those described with relation to FIGS. 3 and 4.

Figure 6:
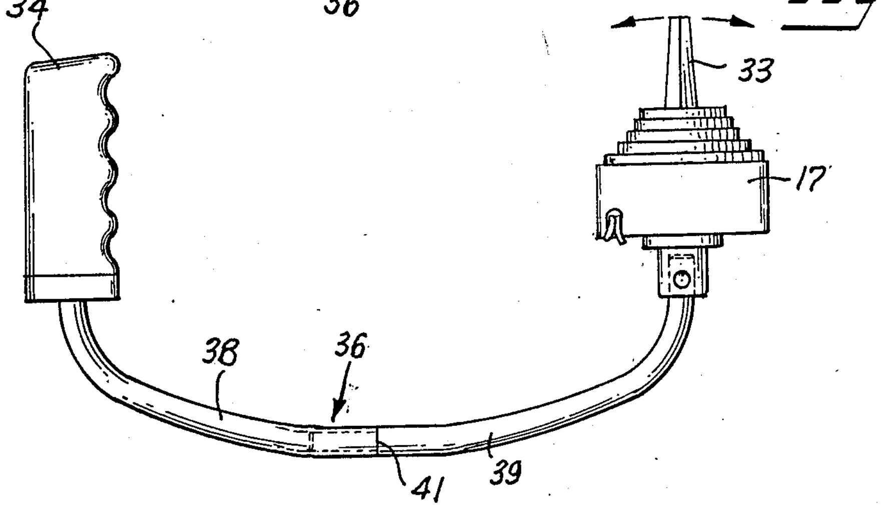
FIG. 6 is a side elevational view of a further modification of the invention shown in FIG. 5.

FIG. 6 of the drawings illustrates still a further embodiment of the invention which is quite similar to the embodiment shown in FIG. 5 of the drawings with the exception that the rigid, elongated tubular member 36 is fabricated in two telescoping parts 38 and 39 which telescope together at a seam shown at 41. In all other respects, the FIG. 6 embodiment of the invention is entirely similar to that shown and described with relation to FIG. 5.

While the invention, as thus far disclosed, has been described principally for use in holding a lever type controller toggle switch assembly for controlling a video game, it is believed obvious that the low cost simple holder made available by the invention can be used to hold different portable, manually operated controller toggle switch means (assemblies) of all types such as rotatable and bendable steering wheel type controller toggle switch assemblies used in controlling model cars, planes and boats as well as rotating track ball type, mouse type, thumb switch type and any other of the known portable manually actuated controller toggle switch assemblies (means) used generally in the directional, up/down, back and forth control of video games, model planes and toys, and like devices.

Figure 8:
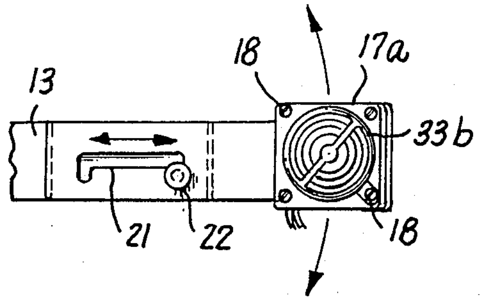
FIG. 8 is a partial plan view of a different form of the invention which uses a controller toggle switch mechanism (means) employing a steering wheel as a control element, and which is substituted for the elongated, "joystick" lever type control element 17 of the holder shown in FIGS. 1 and 2.
Figure 8A:
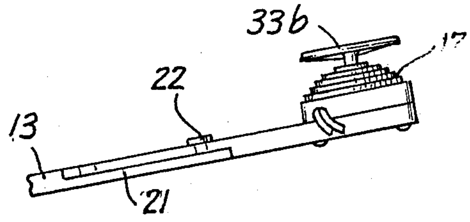
FIG. 8A is a side view of the steering wheel type control element shown in FIG. 8.

FIG. 8 is a partial, plan view of an alternative form of the invention wherein the controller toggle switch means shown generally at **17*a* in FIG. 8 and FIG. 8A employs a steering wheel 33*b* in place of the aviator's joystick type lever 33 of the embodiment of the invention shown in FIGS. 1 and 2 of the drawings. Depending upon the type of video game or children's toy being controlled, the steering wheel 33*b* may simply be rotatable right or left from a median position or, if desired, could be mounted on the end of a movable lever arm that can be moved forward and back to provide two dimensional control along two orthogonal axes. In other respects, the embodiment of the invention shown in FIGS. 8 and 8A is similar to that shown and described with relation to FIGS. 1 and 2** of the drawings and functions in the same manner.

Figure 9:
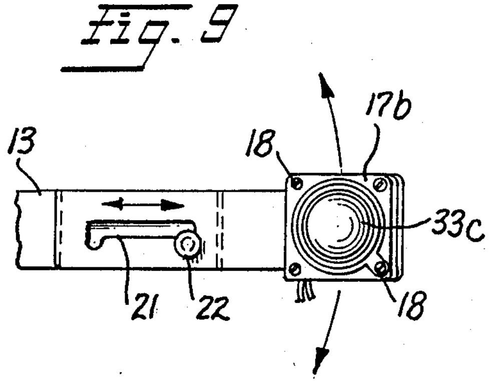
FIG. 9 is a partial plan view of still a different form of the invention having a control element employing a "track ball" or sphere as a control element and which is substituted for the lever type control element of the holder shown in FIGS. 1 and 2.
Figure 9A:
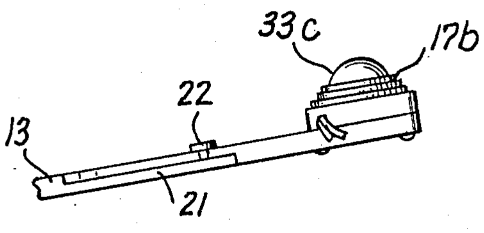
FIG. 9A is a partial side view of the "track ball" or sphere type control element shown in FIG. 9.

FIGS. 9 and 9A of the drawings illustrate another embodiment of the invention wherein a track ball shown at **33*c* in FIGS. 9 and 9A of the drawings is employed as the controller toggle switch means. This type of controller has a captured rotatable ball 33*c* which can be rotated relative to a base plate and derives right, left, forward or back control electrical signals usable by the video game or toy model, etc., to control its operations. An alternative form of a track ball 33*c* would be a "mouse" type control in which the ball or sphere is captured within a movable body member over a planar surface to provide right, left, forward and back controlling output electric signals. In either of these embodiments, rotation of the track ball 33*c*** or movement of the "mouse" in a forward, backward, right, or left direction serves to derive an appropriate controlling output signal for use with the video game, model toy, etc.

Figure 10:
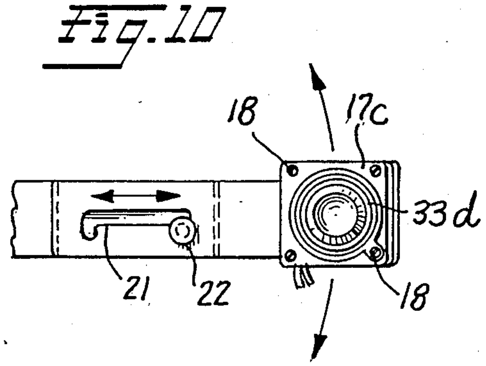
FIG. 10 is a partial plan view of still another embodiment of the invention using a control element employing a thumb switch substituted for the lever type control element of the holder shown in FIGS. 1 and 2.
Figure 10A:
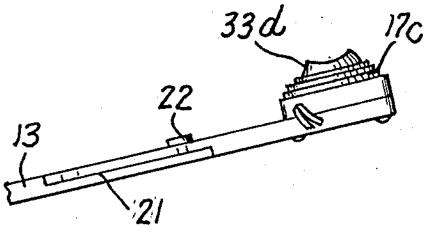
FIG. 10A is a partial side view of the thumb switch type control element shown in FIG. 10.

FIG. 10 of the drawings is a partial plan view of still another embodiment of the invention, also shown in side view in FIG. 10A, wherein a thumb switch type controller **33*d* is employed in place of the joystick lever type controller 33 used in FIG. 1 and FIG. 2. The thumb switch type controller 33*d* functions in much the same manner as the track ball controller shown and described with relation to FIGS. 9 and 9A of the drawings. In other respects the embodiment of the invention shown in FIGS. 10 and 10A functions in a manner similar to that described with relation to FIGS. 1 and 2**.

Figure 11:
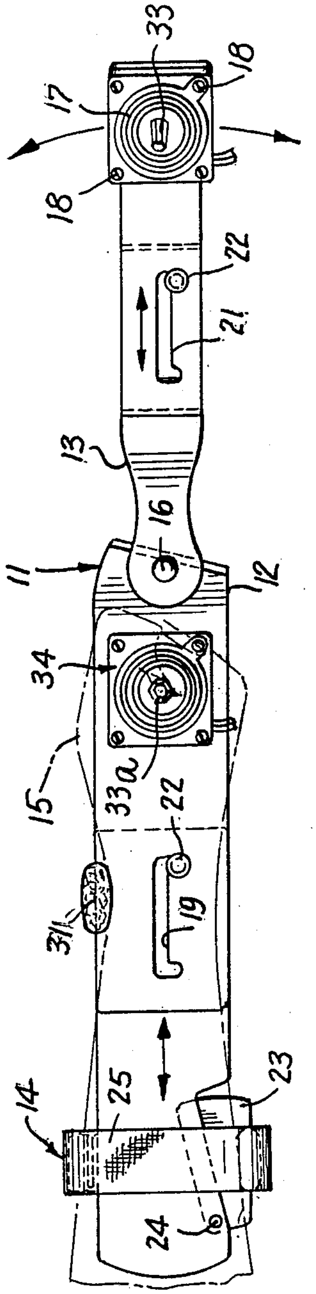
FIG. 11 is a plan view of still another low cost holder according to the invention which employs two separate lever type controller mechanisms in place of a fixed pistol grip or other type of gripping handle and single controller toggle switch mechanism as shown in earlier described embodiments of the invention.
Figure 11A:
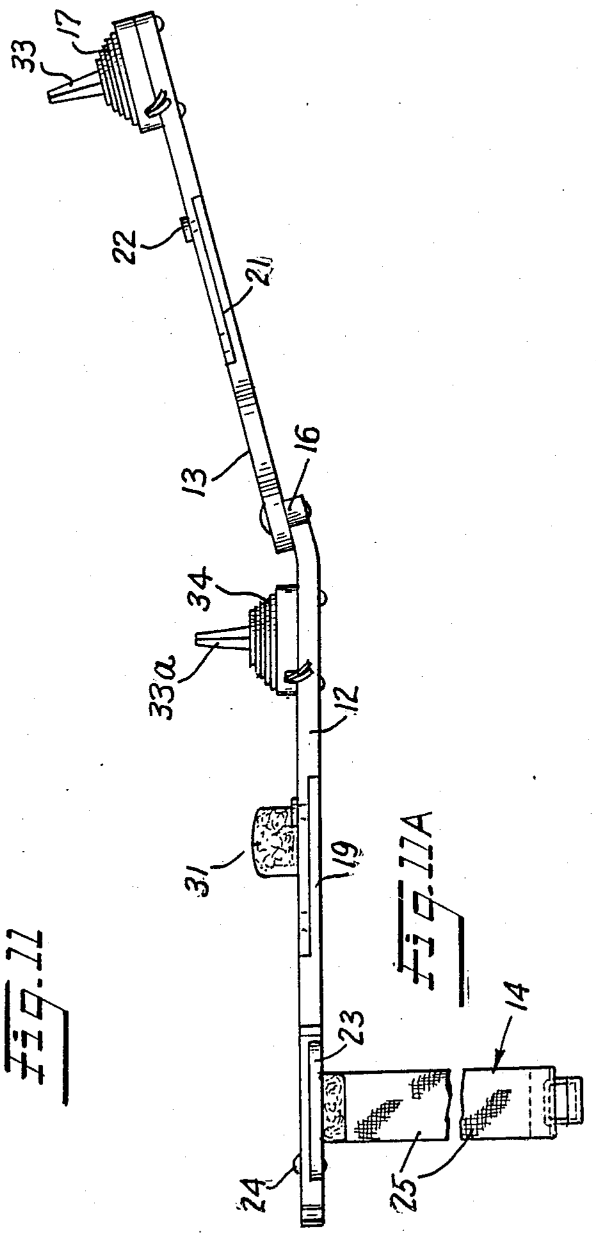
FIG. 11A is a side view of the embodiment of the invention shown in FIG. 11.

FIGS. 11 and 11A of the drawings illustrate still a different embodiment of the invention wherein two different and separately operable toggle switch assemblies 33 and **33*a* are mounted on a single holder according to the invention whereby a single player using the holder can operate the two separate manually operated controller toggle switch assemblies. As seen in FIGS. 11 and 11A, the first mentioned lever type controller switch toggle assembly 17 having a joystick lever 33 is mounted at one end of the elongate member 11 similar to the embodiment of the invention shown in FIGS. 1 and 2. However, in contrast to FIGS. 1 and 2, in FIGS. 11 and 11A a second joystick lever type controller toggle switch assembly 34 having a joystick lever 33*a* is inserted in place of the pistol grip 32 used with the embodiment of the invention shown in FIGS. 1 and 2. By this expedient, a single player having the holder strapped to his or her arm by the velcro strap 25 can both grasp and support the holder with one hand by means of the joystick lever 33*a* of the second or middle lever type controller toggle switch assembly 34 while leaving his or her remaining hand free to manipulate and operate the lever type controller switch assembly 17 via joystick lever 33 at the free or outermost end of elongated holder member 11**. While this results in a more complex holding arrangement, it does allow the simple, low cost holder to be used with more sophisticated types of video games, model plane controls, and the like requiring the use of two manually operated controllers.

INDUSTRIAL APPLICATION

The invention makes available a new, simple and low cost holding device for manually operated, controller toggle switch means such as those used in playing video games formatted by a personal computer for display on a residential television set, or other cathode ray beam tube type display console, or other similar applications of the holding device such as the control of model planes, etc. Hence, the invention constitutes a consumer product that is an adjunct to the television/video game market, the electrically controlled toy market, and others.

Having described several embodiments of a low cost, simple, holder for manually operated controller toggle switch assemblies constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. A simple, low cost, holder for a manual video game controller toggle switch means comprising:

physical support means of simple and inexpensive construction formed by essentially a rigid elongated member having physical holding means at one end thereof for enabling a player to firmly hold the support member and restrain it from physically moving; and wherein the rigid elongated physical support member is formed of two narrow elongated members placed end to end and swivelly secured together at an intermediate point between the ends of the elongated physical support member and further including means for securing these two parts at different angular relations to each other for the comfort of a player; and means for securing a manually operable controller toggle switch means of a video game or the like at a fixed position on the physical support member remote from the physical holding means and at a distance proportioned to the arm length of a player using the controller switch toggle means.

2. A simple, low cost, holder for a manual video game controller toggle switch means according to claim 1 wherein the elongated physical support member further includes means for increasing or decreasing its length to better fit the arm of a player.

3. A simple, low cost, holder for a manual video game controller toggle switch means according to claim 1 wherein the elongated physical support member further includes means for increasing or decreasing the length of each of its two parts to better fit the arm of a player.

4. A simple, low cost, holder for a manual video game controller toggle switch means according to claim 3 wherein the physical support member further includes means for widening the physical support member at at least one point along its length where it is engaged by a player's arm in order to better fit the player.

5. A simple, low cost, holder for a manual video game controller toggle switch means according to claim 6 wherein the physical holding means at one end of the elongated support member comprises a hook and looped fastener system secured to the elongated support member for surrounding a forearm of a player and firmly holding the support member to the player's arm.

6. A simple, low cost, holder for a manual video game controller toggle switch means according to claim 5 further including soft cushioning padding secured to said elongated member at different points along its length including the hook and looped fastener system to improve comfort of a player while wearing the holder.

7. A simple low cost holder for a manually operated controller toggle switch means according to claim 5 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

8. A simple, low cost, holder for a manual video game controller toggle switch means according to claim 1 wherein the physical support member further includes means for widening the physical support member at at least one point along its length where it is engaged by a player's arm in order to better fit the player.

9. A simple, low cost, holder for a manual video game controller toggle switch means according to claim 1 further including soft cushioning padding secured to said elongated member at different points along its length to improve comfort of a player while wearing the holder.

10. A simple, low cost, holder for a manual video game controller toggle switch means according to claim 1 further including additional player holding means disposed intermediate the first-mentioned holding means at one end of the elongated member and the end thereof to which a video game controller toggle switch is secured.

11. A simple, low cost, holder for a manual video game controller toggle switch means according to claim 10 wherein the rigid elongated physical support member is formed in two-parts swivelly secured together at an intermediate point between the ends thereof and further includes additional securing means for securing together the two parts of the elongated member at different angular positions relative to each other for the comfort of a player and and with the additional player holding means being disposed intermediate the first-mentioned holding means at one end of the elongated member and the end thereof to which a video game controller toggle switch means is secured, and wherein the additional player holding means is in the form of a pistol grip secured to the first part of the two part elongated member adjacent the point thereof where the two parts are swivelly secured together.

12. A simple, low cost, holder for a manual video game controller toggle switch means according to claim 11 wherein the elongated physical support member further includes means for increasing or decreasing the length of each of its two parts to better fit the arm of a player.

13. A simple, low cost, holder for a manual video game controller toggle switch means according to claim 12 wherein the physical support member further includes means for widening the physical support member at at least one point along its length where it is engaged by a player's arm in order to better fit the player.

14. A simple, low cost, holder for a manual video game controller toggle switch means according to claim 13 wherein the physical holding means at one end of the elongated support member comprises a hook and looped fastener system secured to the elongated support member for surrounding an arm of a player and firmly holding the support member to the player's arm.

15. A simple, low cost, holder for a manual video game controller toggle switch means according to claim 14 further including soft cushioning padding secured to said elongated member at different points along its length including the hook and looped fastener system to improve comfort of a player while wearing the holder.

16. A simple low cost holder for a manually operated controller toggle switch means according to claim 11 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

17. A simple low cost holder for a manually operated controller toggle switch means according to claim 12 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

18. A simple low cost holder for a manually operated controller toggle switch means according to claim 15 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

19. A simple, low cost, holder for a manual video game controller toggle switch means according to claim 1 wherein the physical holding means at one end of the elongated support member comprises a hook and looped fastener system secured to the elongated support member for surrounding a forearm of a player and firmly holding the support member to the player's arm.

20. A simple, low cost, holder for a manual video game controller toggle switch means according to claim 1 wherein the elongated member is a single integral rigid member having a handle in the form of a pistol grip that can be grasped by a player and which constitutes the physical holding means at one end of the elongated member while he or she manipulates the controller of a video game mounted at the remaining opposite end of the elongated member.

21. A simple, low cost, holder for a manual video game controller toggle switch means according to claim 20 wherein the elongated physical support member further includes means for increasing or decreasing its length to better fit the arm of a player.

22. A simple low cost holder for a manually operated controller toggle switch means according to claim 20 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

23. A simple, low cost, holder for a manual video game controller toggle switch means according to claim 1 wherein the rigid elongated member is shaped in the form of an arc to more comfortably support the arm of a player.

24. A simple, low cost, holder for a manual video game controller toggle switch means according to claim 1 wherein the means for securing a controller toggle of a video game comprises a supporting base to which a separate video game controller toggle switch means can be seated and secured so as to be readily grasped by one hand of a player.

25. A simple, low cost, holder for a manual video game controller toggle switch means according to claim 1 wherein a video game controller is integrally mounted in the means for securing a video game controller toggle switch means during manufacture of the holder.

26. A simple low cost holder for a manually operated controller toggle switch means according to claim 1 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

27. A simple, low cost, holder for a manual video game controller toggle switch means comprising:
 physical support means of simple and inexpensive construction formed by essentially a rigid elongated member having physical holding means at one end thereof for enabling a player to firmly hold the support member and restrain it from physically moving; and
 wherein the rigid elongated physical support member is formed of two narrow elongated members placed end to end and swivelly secured together at an intermediate point between the ends of the elongated physical support member and further including means for securing these two parts at different angular relations to each other for the comfort of a player; and
 means for securing a manually operable controller toggle switch means of a video game or the like at a fixed position on the physical support member remote from the physical holding means and at a distance proportioned to the arm length of a player using the controller switch toggle means.

28. A simple, low cost, holder for a manually operated controller toggle switch means according to claim 27 further including additional player holding means disposed intermediate the first-mentioned holding means at one end of the elongated member and the end thereof to which a manually operated controller toggle switch means is secured and wherein the additional player holding means is in the form of a pistol grip secured to the first part of the two part elongated member adjacent the point thereof where the two parts are swivelly secured together.

29. A simple, low cost, holder for a manually operated controller toggle switch means according to claim 28 wherein the physical holding means at one end of the elongated support member comprises a hook and looped fastener system secured to the elongated support member for surrounding an arm of a player and firmly holding the support member to the player's arm.

30. A simple low cost holder for a manually operated controller toggle switch means according to claim 29 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

31. A simple, low cost, holder for a manually operated controller toggle switch means according to claim 27 wherein the elongated member is a single integral rigid member having a handle in the form of a pistol grip that can be grasped by a player/operator and which constitutes the physical holding means at one end of the elongated member while he or she manipulates the controller toggle of a manually operated controller toggle switch mounted at the remaining opposite end of the elongated member.

32. A simple low cost holder for a manually operated controller toggle switch means according to claim 27 wherein the manually operated controller toggle switch means comprises any one of a joystick lever type controller toggle switch assembly, a rotatable steering wheel type controller toggle switch assembly, a rotating ball type controller toggle switch assembly, a mouse type controller toggle switch assembly, a thumb switch type controller toggle switch assembly, or the like.

33. A simple, low cost, holder for a manually operated controller toggle switch means according to claim 27 further including additional player holding means disposed intermediate the first-mentioned holding means at one end of the elongated member and the end to which a manually operated controller toggle switch means is secured, and wherein the additional player holding means is in the form of an additional manually operated controller toggle switch means.

34. A simple, low cost, holder for a manually operated controller toggle switch means according to claim 27 and further including additional player holding means disposed intermediate the first-mentioned holding means at one end of the elongated member and the end to which a manually operated controller toggle switch means is secured, and wherein the additional player holding means is in the form of an additional manually operated controller toggle switch means.

* * * * *